United States Patent [19]

Coldren

[11] Patent Number: 4,657,331

[45] Date of Patent: Apr. 14, 1987

[54] STRAIN RELIEF FOR ELECTRICAL CONNECTOR ASSEMBLIES

[75] Inventor: Daniel R. Coldren, Enola, Pa.

[73] Assignee: AMP Incorporated, Harrisburg, Pa.

[21] Appl. No.: 736,615

[22] Filed: May 21, 1985

[51] Int. Cl.[4] ........................ H01R 13/58; H02B 1/02

[52] U.S. Cl. ................................................ 339/125 R

[58] Field of Search ............... 339/103 R, 103 N, 104, 339/107, 125 R

[56] References Cited

U.S. PATENT DOCUMENTS 3,828,302 8/1974 Cieniawa et al. .......... 339/103 M X 4,488,769 12/1984 Feigl ............................... 339/103 M

*Primary Examiner*—Eugene F. Desmond

*Attorney, Agent, or Firm*—Robert W. J. Usher

[57] ABSTRACT

A strain relief member (40) comprises a sleeve-form body (41) from respective opposite sides of which a cable tie (42) and a latching arm (43) extend in opposite axial directions. The sleeve-form body (41) is adapted to be snap fitted on the wire receiving face (23') of one connector (12') and the latching arm (43) engages an abutment (31) on a mating connector (11') both to latch the connectors (11', 12') assembled together and provide strain relief. The connector housings (11', 12') may be a simple modification of existing housings (11, 12) assembly avoiding retooling changes by modification of the original mould.

11 Claims, 6 Drawing Figures

10
11
12
13
14
15
16
17
18
19
21
22
23
25
26
27
28
11'
12'
14'
16'
23'
26'
27'
29'
31
32
34
40
41
42
43
44
45
47
48

STRAIN RELIEF FOR ELECTRICAL CONNECTOR ASSEMBLIES

The invention relates to electrical connector assemblies.

In many electrical connector assemblies, the connectors are retained mated together by the contact force of the intermated terminals. However, in some applications, the wires terminated in a connector are subject to stress and it is necessary to provide strain relief. In addition, because of the stress on the wires, it may be necessary to provide means positively to latch the connectors together.

However, for reasons of economy and to minimize the size of the connector assemblies, it is desirable that the provision of strain relief be optional and readily added to the connectors with minimal modification thereof enabling them still to be produced at low cost.

According to one aspect of the invention, there is provided an electrical connector assembly comprising intermatable first and second connectors having respective insulating housings with terminal receiving through cavities extending between mating and conductor receiving faces of the housings, intermatable terminals received in the cavities and a strain relief member located on the second housing at a location remote from the first housing and having means to confine conductors extending from the conductor receiving face, the strain relief member being provided with a releasable latching arm which extends across the second housing into latching engagement with a latching abutment on the first housing with the second housing trapped therebetween, thereby to secure the strain relief member to the first and second housings and the second housing to the first housing.

The strain relief member thereby both affords strain relief for the conductors and latches the housings together. The optional strain relief and latching facility is thereby provided with minimal alteration of the conventional connector housings which, when used without the strain relief member, avoids the cost and bulk of an unnecessary latch enabling close stacking of the housing on a printed circuit board or panel and with minimal alterations of an original mould for the prior housing. The necessary abutment lies within the overall cross-sectional size of the unmodified housing.

Preferably, complimentary locking means are provided on the second housing and the strain relief member engageable in a snap action to lock the strain relief member to the second housing. The locking means may be a small abutment or shoulder moulded on the second housing enabling the modified connector to be accommodated in the same space as the unmodified connector when the strain relief member is not required. This also enables a more stable mounting of the strain relief member to be achieved facilitating handling of the second housing and strain relief member as a composite part. Where the strain relief member is not used the abutments may provide finger engageable pieces assisting unmating.

The strain relief member, preferably, comprises a sleeve-form connector receiving body, latching detents being formed on the body, a flexible web extending axially from the body and carrying at a free end a transversely extending cable tie. The latching arm may extend axially from the body in a direction opposite to the flexible web.

The strain relief member may easily be applied to the modified connector housing when required. Flexure of the web permits centralization of the wire bundle when tied.

An exmple of an electrical connector assembly according to the invention will now be described with reference to the accompanying drawings in which.

Figures 1, 2:
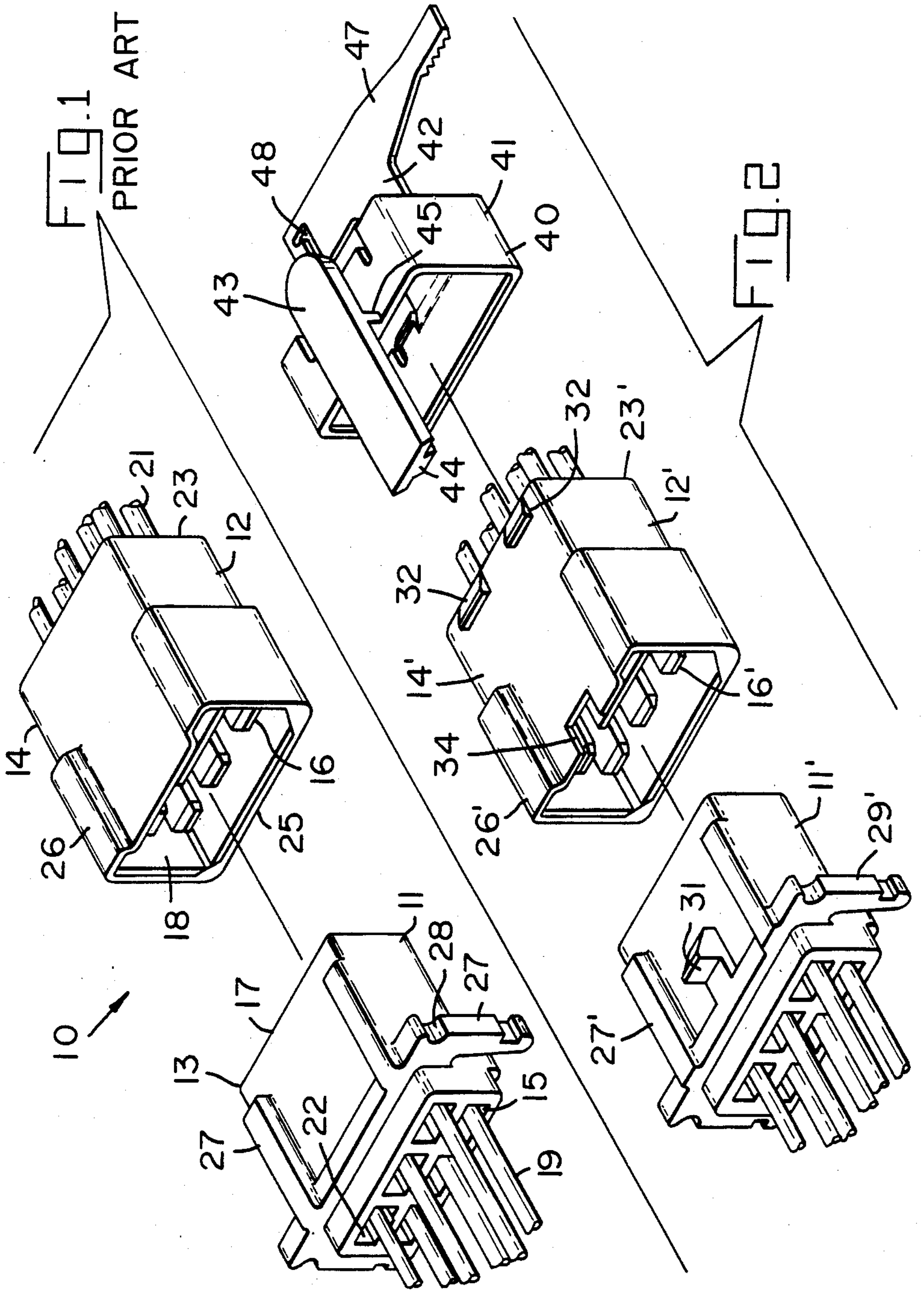
FIG. 1 PRIOR ART
FIG. 1 is a perspective view of a known connector assembly.
FIG. 2 is a perspective view of a connector assembly according to the invention.

As shown in FIG. 1, a known type of connector assembly 10 comprises intermatable male and female connectors 11 and 12 comprising insulating housings 13 and 14, respectively, formed with through cavities receiving conventional socket and tab terminals 15 and 16, respectively. The terminals are intermatable at mating faces of the housings 17 and 18 and terminate wires 19 and 21 extending from wire receiving faces 22 and 23, opposite the respective mating faces. The mating face of the female housing is formed with a hood 25 having laterally spaced enlarged portions 26 for receiving aligned guiding ribs 27 on the male housings when the housings are intermated. Latching legs 27 depend from opposite sides of the male housing 13 adjacent the wire receiving face for mounting the connector on the surface of a panel. The legs are formed with bolt locating notches 28 for use when it is desired to mount the connector with the wire receiving face extending through a panel aperture.

For many applications, the cumulative force between the tabs and sockets is sufficient to retain the connectors in their mated condition. However, in some applications, the wires are subject to stress which not only may damage the termination and dislodge the terminal but also tend to pull the mated connectors apart.

The conventional housings are both manufactured of plastics by a conventional moulding technique utilizing relatively inexpensive straight draw moulds and it is desirable to retain this economical manufacturing technique with small alteration of the connectors shape preferably to enable the use of the original dies with only minimal alteration while providing any required strain relief.

Figure 3:
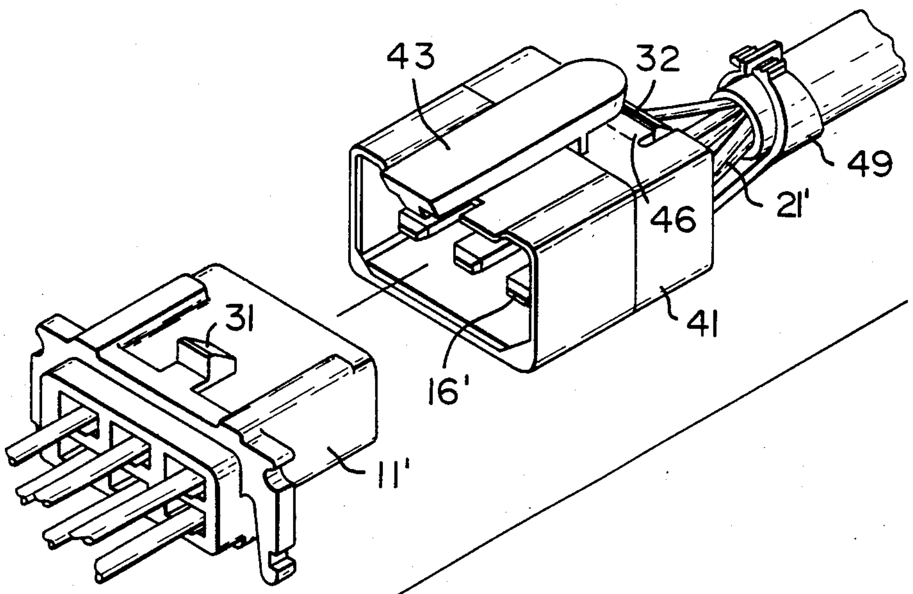
FIG. 3 is a perspective view of the assembly of FIG. 2 with the strain relief member mounted on the female connector.
Figure 4:
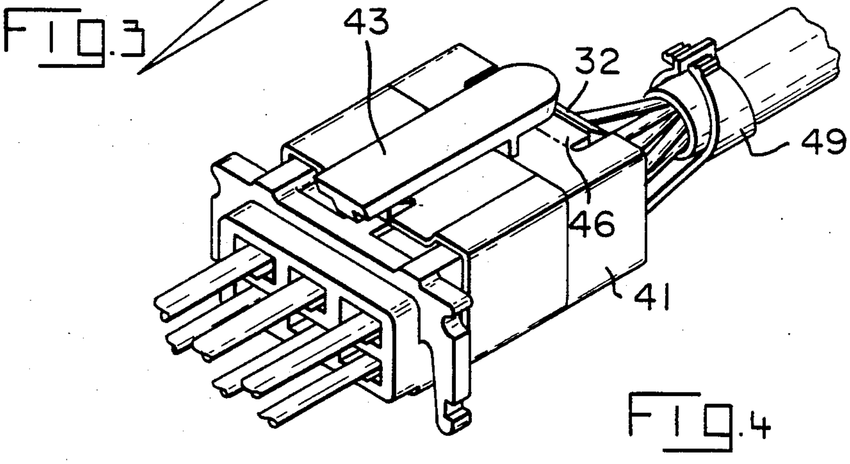
FIG. 4 is a perspective view of the assembly of FIG. 3 with the male and female connector latched together.
Figures 5, 6:
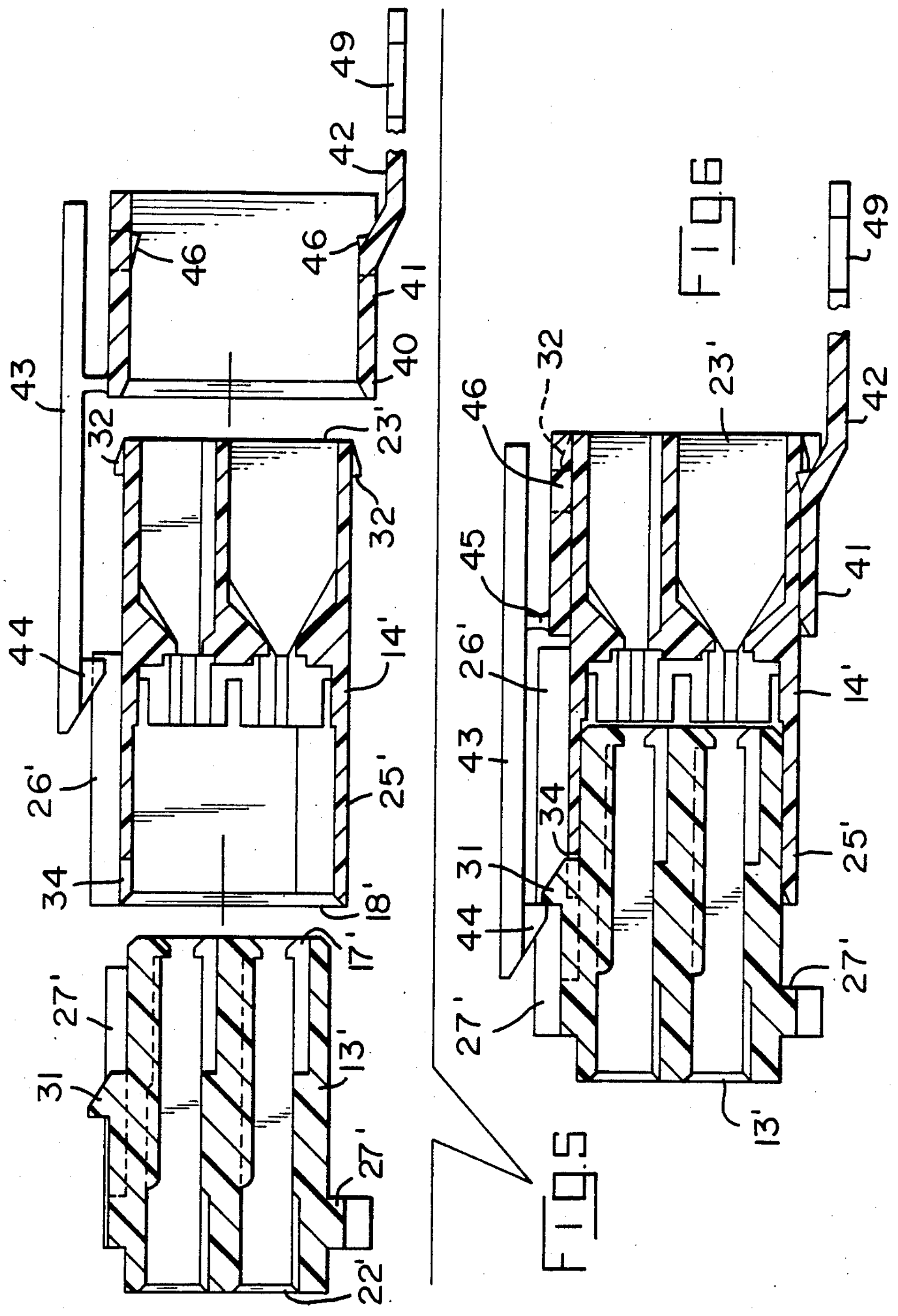
FIG. 5 is a cross-sectional view taken along line 5—5 of FIG. 2 with the termination omitted; and, FIG. 6 is a cross-sectional view taken along line 4—4 of FIG. 4 with the terminations omitted.

In the example of the connector assembly of the invention, shown in FIGS. 2–4, in which primed reference numerals indicate like parts, the conventional connector housings are modified by forming a latching shoulder 31 between the ribs 27' adjacent the wire receiving face 22' of the male housing 13', oppositely facing latches 32 on opposite side walls between the enlargements 26' adjacent the wire receiving face 23' of the female housing 14'; and, a rebate 34 on the leading end of the hood 25' aligned to receive the shoulder 31.

A strain relief member 40 is moulded in one piece of plastics material with a rectangular sleeve-form body portion 41 from respectively opposite sides of which a wire confining member 42 and a latching arm 43 extend, axially rearwardly and axially forwardly, respectively.

The laching arm 43 has a catch 44 at a forward end for engagement with the shoulder 31 and is integrally joined by a web pivot 45 adjacent but spaced from a rear end to operate as a second order lever. Opposite sides of the body adjacent the rear are formed with latching detents 46 for engagement with shoulders 32 on the female housing.

The wire confining member 42 is of T-form comprising an elongate flexible web 43 extending rearwardly from a location between the detents 46 and carrying, at a free rear end, a cable tie 49 formed by a transversely extending strip formed with a tongue and eye fastening 47, 48 at respective opposite ends.

As can readily be seen from FIGS. 2 and 3, when strain relief is required, the body 41 of the strain relief member is simply pushed over the wire receiving face 23' of the female housing 14' so that the detents 46 and abutments 32 snap into engagement and the forward edge of the body 41 seats against the enlarged portions 26'. Terminated wires 21' can then be stitched into the female housing and the tie 49 fastened around the wire bundle. Flexure of the web permits centralization of the bundle at the wire receiving face. The male and female connectors may then simply be pushed together into mating relation with resilient flexure of the latching arm until catch 44 snaps into engagement with shoulder 31. Unlatching may be effected by normal deflection of the rear end of the latch.

The connector assembly provides effective strain relief and latching when required. The additional expense and bulk of a connector latch and strain relief member is avoided when not required, only the male and female connectors then being used. Thus, a family of connectors may be provided at low cost with or without strain relief, the male and female housings being closely similar to existing housing structures enabling adaptation of the prior mould at minimal cost.

I claim:

1. An electrical connector assembly for mounting on a panel comprising intermatable first and second connectors having respective insulating housings each moulded in one piece of plastics material with terminal receiving through cavities extending between mating and conductor receiving faces of the housings, intermatable terminals received in the cavities and a one-piece strain relief member located on the second housing at a location remote from the first housing and having means to confine conductors extending from the conductor receiving face, the strain relief member being provided with a releasable latching arm which extends across the second housing into direct latching engagement with a latching abutment integrally formed on the first housing with the second housing trapped therebetween, thereby to secure the strain relief member to the first and second housings and the second housing to the first housing, latching legs projecting from the first housing adjacent the conductor receiving face for mounting the connector on the surface of a panel with the housing axis extending parallel thereto.

2. An electrical connector assembly according to claim 1 in which the first housing is also formed adjacent the conductor receiving face with means to engage the periphery of a panel aperture with the conductor receiving face extending therethrough.

3. An electrical connector assembly according to claim 1 in which complimentary locking means are provided on the second housing and the strain relief member, engageable in a snap action to lock the strain relief member to the second housing.

4. An electrical connector assembly according to claim 1 in which the first housing is provided with means adjacent the conductor receiving face to secure the first housing to a support and the latching abutment is adjacent the conductor receiving face of the first housing.

5. An electrical connector assembly according to claim 1 in which the confining means comprise a cable tie supported by a flexible web extending from a body portion of the strain relief member.

6. An electrical connector assembly according to claim 1 in which the wire receiving face of the second connector is opposite the mating face and the strain relief member comprises a sleeve-form body portion which surrounds the conductor receiving face with the conductors extending therethrough and the latching arms extending axially forwardly therefrom.

7. An electrical connector assembly according to claim 6 in which the conductor confining member comprise a flexible web extending axially rearwardly from the body and carrying a cable tie at a rear end.

8. An electrical connector assembly for mounting on a panel comprising intermatable first and second connectors having respective insulating housings each moulded in one piece of plastics material with terminal receiving through cavities extending between mating and conductor receiving faces of the housings, the mating face of the second connector being opposite the conductor receiving face; latching legs projecting from the first housing adjacent the conductor receiving face for mounting the connector on the surface of a panel with the housing axis extending parallel thereto; intermatable terminals received in the cavities; a latching abutment integrally formed on the first housing; and, a one-piece strain relief member comprising a sleeve-form body from one axial end of which extends conductor confining means and from the other axial end of which extends a releasable latching arm, the sleeve-form body receiving the conductor receiving face of the second connector with the conductors extending therethrough confined by the confining means and the latching arm extending across the second housing into direct latching engagement with the latching abutment thereby trapping the second housing between the first housing and the strain relief member securing the strain relief member to the first and second housings and the second housing to the first housing.

9. An electrical connector assembly according to claim 8 in which the first housing is also formed adjacent the conductor receiving face with means to engage the periphery of a panel aperture with the conductor receiving face extending therethrough.

10. An electrical connector assembly according to claim 8 in which complimentary locking means are provided on the second housing and the strain relief member engageable in a snap action to lock the strain relief member to the second housing.

11. An electrical connector assembly according to claim 10 in which the confining means comprises a cable tie supported by a flexible web extending axially from the body portion of the strain relief member.

* * * * *